United States Patent
Konitzer et al.

(10) Patent No.: US 8,636,195 B2
(45) Date of Patent: Jan. 28, 2014

(54) WELDING PROCESS AND COMPONENT FORMED THEREBY

(75) Inventors: Douglas Gerard Konitzer, West Chester, OH (US); Eric Scott Huron, West Chester, OH (US); David Paul Mourer, Beverly, MA (US); Brian James Girvin, West Chester, OH (US); Glenn Charles Culbertson, Mason, OH (US); Daniel Edward Wines, Cincinnati, OH (US); Daniel David Noe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 12/708,650

(22) Filed: Feb. 19, 2010

(65) Prior Publication Data

US 2011/0206523 A1    Aug. 25, 2011

(51) Int. Cl.
 *B23K 20/12* (2006.01)
 *B23P 15/04* (2006.01)

(52) U.S. Cl.
 USPC .......................... 228/113; 228/182; 29/889.2

(58) Field of Classification Search
 None
 See application file for complete search history.

(56) References Cited

U.S. PATENT DOCUMENTS

| | | | |
|---|---|---|---|
| 4,483,054 A * | 11/1984 | Ledwith | 29/889.2 |
| 4,957,567 A | 9/1990 | Krueger et al. | |
| 5,106,012 A | 4/1992 | Hyzak et al. | |
| 5,161,950 A | 11/1992 | Krueger et al. | |
| 5,455,120 A | 10/1995 | Walston et al. | |
| 5,482,789 A | 1/1996 | O'Hara et al. | |
| 6,074,602 A | 6/2000 | Wukusick et al. | |
| 6,219,916 B1 * | 4/2001 | Walker et al. | 29/889.21 |
| 6,471,474 B1 * | 10/2002 | Mielke et al. | 415/199.4 |
| 6,511,294 B1 | 1/2003 | Mielke et al. | |
| 6,521,175 B1 | 2/2003 | Mourer et al. | |
| 6,666,653 B1 | 12/2003 | Carrier | |
| 6,969,238 B2 | 11/2005 | Groh et al. | |
| 7,370,787 B2 * | 5/2008 | Bacon et al. | 228/112.1 |

(Continued)

FOREIGN PATENT DOCUMENTS

| | | | |
|---|---|---|---|
| EP | 0668171 A | * | 8/1995 |
| EP | 1920870 A1 | | 5/2008 |
| EP | 2047945 A1 | | 4/2009 |
| GB | 535229 | | 4/1941 |

OTHER PUBLICATIONS

EP Search Report and Opinion issued Jul. 8, 2011 in connection with corresponding EP Application No. 11155086.9.

*Primary Examiner* — Kiley Stoner
(74) *Attorney, Agent, or Firm* — William Scott Andes; Gary M. Hartman; Domenica N. S. Hartman

(57) ABSTRACT

A process of fabricating a rotating component and a rotating component formed thereby. The rotating component has a rotational axis, at least one rim member, at least one disk member, and at least one airfoil member. The rim and disk members are welded together to define a first solid-state weld joint lying in a first plane that is not parallel to the rotational axis of the rotating component. The airfoil member is welded to the rim member to define a second solid-state weld joint lying in a second plane that is not parallel to the rotational axis of the rotating component. The rim member is located in a radially outward direction from the disk member, and the airfoil member is located in a radially outward direction from the rim member.

15 Claims, 2 Drawing Sheets

(56) References Cited

U.S. PATENT DOCUMENTS

| | | |
|---|---|---|
| 7,811,062 B1* | 10/2010 | Twigg .......................... 416/218 |
| 2003/0223873 A1* | 12/2003 | Carrier .................... 416/213 R |
| 2005/0084381 A1* | 4/2005 | Groh et al. ............... 416/244 A |
| 2007/0071608 A1* | 3/2007 | Trewiler et al. .......... 416/241 R |
| 2008/0016688 A1 | 1/2008 | Fabre et al. |
| 2008/0089788 A1* | 4/2008 | Loehle et al. ................ 416/191 |
| 2008/0107533 A1* | 5/2008 | Carrier et al. ............ 416/213 R |
| 2008/0120842 A1 | 5/2008 | Wines et al. |
| 2008/0124210 A1 | 5/2008 | Wayte et al. |
| 2008/0219853 A1* | 9/2008 | Baker et al. .............. 416/241 R |
| 2010/0239428 A1* | 9/2010 | Carrier et al. ................ 416/230 |
| 2011/0005075 A1* | 1/2011 | Trewiler et al. .............. 29/889.1 |
| 2013/0064672 A1* | 3/2013 | Izadi ........................ 416/223 R |

* cited by examiner

WELDING PROCESS AND COMPONENT FORMED THEREBY

BACKGROUND OF THE INVENTION

The present invention generally relates to fabrication processes that include a joining operation. More particularly, this invention is directed to a technique for fabricating rotating hardware, as an example, rotating components of a turbomachine, joining techniques used in their fabrication, and the hardware formed thereby.

Components within the combustor and turbine sections of a gas turbine engine are often formed of superalloy materials, typically titanium-, cobalt-, nickel-, and steel-based alloys, in order to achieve acceptable mechanical properties while at elevated temperatures resulting from the hot combustion gases produced in the combustor. Higher compressor exit temperatures in modern high pressure ratio gas turbine engines can also necessitate the use of high performance superalloys for compressor components, including blades, spools, disks (wheels), blisks, and other components. Suitable alloy compositions and microstructures for a given component are dependent on the particular temperatures, stresses, and other conditions to which the component is subjected. For example, airfoils such as compressor and turbine blades (buckets) and vanes (nozzles) are often formed as equiaxed, directionally solidified (DS), or single crystal (SX) superalloy castings to withstand the high temperatures and stresses to which they are subjected within their respective sections of a gas turbine engine, whereas the rotating hardware to which the airfoils are mounted, such as turbine disks and compressor spools and disks, are typically formed of superalloys that must undergo carefully controlled forging, heat treatments, and surface treatments to produce a controlled grain structure and desirable mechanical properties. Because of their different requirements, airfoils and their supporting rotating hardware are typically formed from different alloys. Particular examples of blade alloys include steels such as A286 and AM-355, titanium-based alloys such as Ti-6Al-4V and Ti-8Al-1V-1Mo, cast and wrought polycrystalline gamma prime ($\gamma'$) precipitation-strengthened nickel-based alloys such as U720, IN718, and cast mono-crystal or single-crystal gamma prime precipitation-strengthened nickel-based alloys such as MX4 (U.S. Pat. No. 5,482,789), René N5 (U.S. Pat. No. 6,074,602), RenéN6 (U.S. Pat. No. 5,455,120), CMSX-10, CMSX-12, and TMS-75. Particular examples of disk alloys include gamma prime precipitation-strengthened nickel-based alloys such as René88DT (U.S. Pat. No. 4,957,567), René104 (U.S. Pat. No. 6,521,175), and certain nickel-base alloys commercially available under the trademarks Inconel®, Nimonic®, and Udimet®.

In view of the above, blisks (also referred to as bladed disks and integrally bladed rotors) used in compressors of gas turbine engines have often necessitated certain compromises because their disks and blades are manufactured as a single integral part, as opposed to manufacturing the disks and blades separately and then mechanically fastening the blades to the disk. FIG. 1 is a fragmentary cross-sectional representation of a blisk 10 of a type that may be used in a gas turbine engine. The blisk 10 is represented as having a unitary construction that includes a rim 12, disks 14 (wheels), and blades (buckets) 16 (of which only one is shown). Each disk 14 has a bore (hub) 18 at its radially innermost extent and a relatively thinner web 20 between its bore 18 and the rim 12. A through-hole 22 is centrally located in the bore 18 for mounting the disk 10 on a shaft (not shown) driven by the turbine section of the engine, and therefore the common central axis 24 of the disks 14 coincides with the axis of rotation of the blisk 10. Other aspects of the blisk 10 and the construction and operation of the compressor and engine in which the blisk 10 may be installed are known in the art and therefore will not be discussed here in any detail.

The weight and cost of single-alloy blisks of the type represented in FIG. 1 have driven the desire to develop materials, fabrication processes, and hardware designs capable of reducing forging weight and costs. One approach is prompted by the fact that the bores and webs of blisks have lower operating temperatures than their rims and blades, and therefore can be formed of alloys with properties different from those required by the rims and blades. Depending on the particular alloy or alloys used, optimal microstructures for the bore, web, rim and blades also typically differ. For example, a relatively coarse grain size may be optimal for the rim to improve tensile strength and resistance to low cycle fatigue, while a finer grain size may be optimal in the bore and web for improving creep, stress-rupture, and crack growth resistance.

In U.S. Published Patent Application Nos. 2008/0120842 and 2008/0124210, multi-alloy rotor assemblies are described as fabricated by separately forming the bore and rim of a disk from different materials and then joining the bore and rim in the web region therebetween using a metallurgical joining process. A variety of joining techniques are available for this purpose, such as inertia welding as disclosed in U.S. Published Patent Application No. 2008/0124210. As rotor assemblies, blades are retained in slots at the perimeter of the rim, instead of being manufactured as a single integral part with the rim as in the case with blisks. Accordingly, blisks pose an additional challenge to the fabrication of multi-alloy rotating hardware using the teachings of U.S. Published Patent Application Nos. 2008/0120842 and 2008/0124210.

BRIEF DESCRIPTION OF THE INVENTION

The present invention provides a process of fabricating rotating hardware, as an example, rotating components of turbomachines, joining techniques used in their fabrication, and rotating hardware formed thereby.

According to a first aspect of the invention, the process includes separately fabricating at least one rim member, at least one disk member and at least one airfoil member to have axes of symmetry coinciding with the rotational axis of the component, forming pre-weld interface surfaces on the rim and disk members at which the rim and disk members can be joined to locate the rim member in a radially outward direction of the disk member, and forming pre-weld interface surfaces on the rim and airfoil members at which the rim and airfoil members can be joined to locate the airfoil member in a radially outward direction of the rim member so that the interface surfaces lie in planes that are not parallel to the rotational axis of the rotating component. An inertia welding process is then performed in which two of the rim, disk and airfoil members are welded together by causing relative axial and rotational movement therebetween and forming a first solid-state weld joint at the pre-weld interface surfaces thereof to thereby form a welded subassembly, and then inertia welding the welded subassembly to the third of the rim, disk and airfoil members by causing relative axial and rotational movement therebetween and forming a second solid-state weld joint at the pre-weld interface surfaces thereof.

Another aspect of the invention is a rotating component having a rotational axis, at least one rim member having a platform portion at a radially outward extent of the rim member and a first web portion at a radially inward extent of the rim member, at least one disk member having a second web portion at a radially outward extent of the disk member, and at least one airfoil member. The first and second web portions of the rim and disk members are welded together to define a first solid-state weld joint lying in a first plane that is not parallel to the rotational axis of the rotating component. The rim member is located in a radially outward direction from the disk member, and the first and second web portions form a web that secures the rim member to the disk member. The airfoil member is welded to the rim member to define a second solid-state weld joint that is not parallel to the rotational axis of the rotating component, and the airfoil member is located in a radially outward direction from the rim member.

A technical effect of the invention is the ability to produce rotating hardware comprising more than two subcomponents, a particular example of which is a multi-alloy rotating component. This capability is advantageous when producing, for example, a multi-alloy blisk having a rim, bore and blades formed of different materials or by different processes that can be tailored or otherwise particularly selected for the different operating conditions of the rim, bore and blades. The invention can potentially be applied to a wide variety of alloys, heat treatments, and processing conditions to achieve different grain sizes and structures within the rim, bore and blades of a blisk.

Other aspects and advantages of this invention will be better appreciated from the following detailed description.

DETAILED DESCRIPTION OF THE INVENTION

The present invention will be described with reference to rotating hardware of the type used in turbomachines, and particularly blisks of high-bypass gas turbine engines. For convenience, the invention will be described in particular reference to a blisk 50 represented in FIG. 5, though it should be understood that the teachings and benefits of the invention are not limited to this particular blisk 50 and can be adapted and applied to a wide range of rotating hardware.

Figure 1:
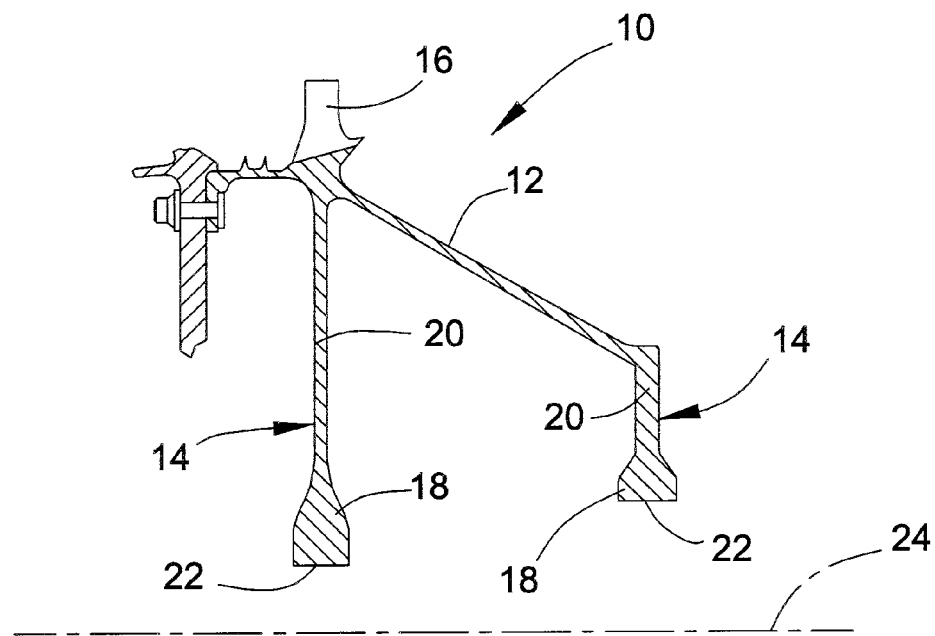
FIG. 1 is a fragmentary cross-sectional view of a gas turbine engine blisk having a unitary construction according to the prior art.
Figure 2:
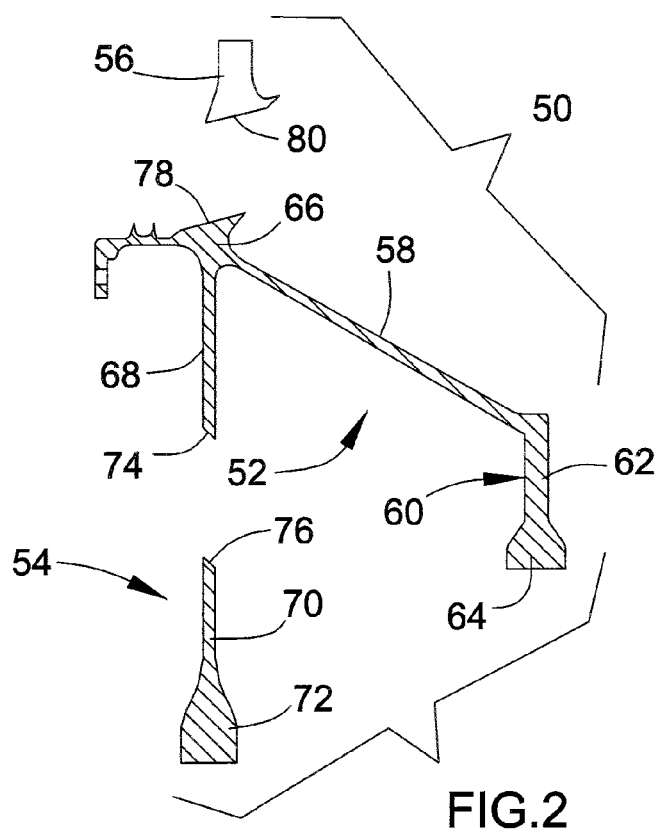
FIG. 2 is an exploded view of a blisk similar to that represented in FIG. 1, but comprising subcomponents in accordance with an embodiment of the present invention.
Figure 4:
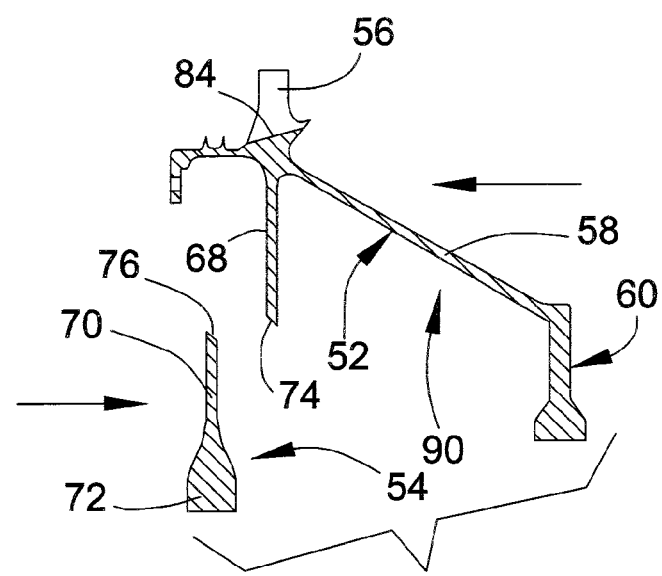
Figure 5:
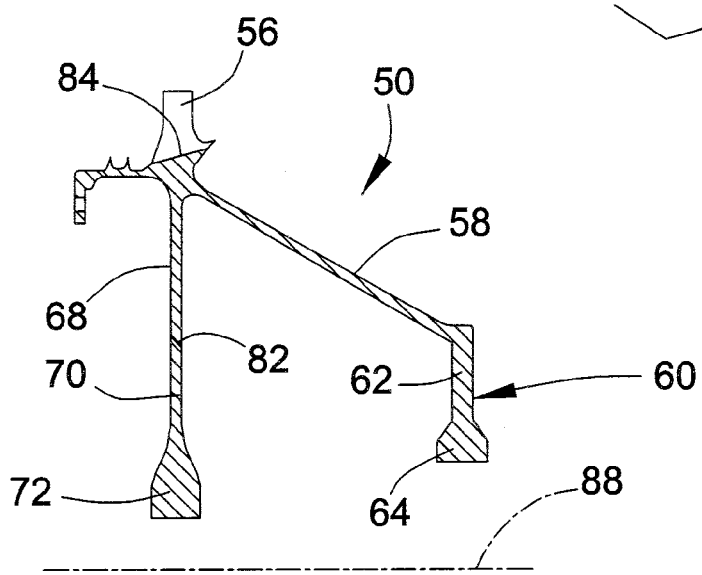
FIG. 5 is a fragmentary cross-sectional view of the blisk formed by the steps represented in FIGS. 3 and 4.

In FIG. 2 depicts an exploded view in the blisk 50 of FIG. 5, and prior to joining individual subcomponents 52, 54 and 56 of the blisk 50. The subcomponents 52, 54 and 56 include a rim member 52, a disk member 54, and an airfoil member 56 from which multiple airfoils can be later extracted. It should be appreciated that, as a component that rotates at high speeds about its axis of rotation 88 (FIG. 5), the blisk 50 has an axisymmetric configuration, but as a matter of convenience a diametrically opposite portion of the blisk 50 is not shown in FIG. 2 or 5, nor in FIGS. 3 and 4 which show a procedure for assembling the blisk 50. Furthermore, the rim member 52 and the disk member 54 each have an axis of symmetry that generally coincides with the rotational axis 88 of the blisk 50. The rim member 52 comprises an annular-shaped rim 58, integral disk and web portions 60 and 68 that extend radially inward from the rim 58, and platform portions 66 that extend radially outward from the rim 58. The integral disk portion 60 of the rim member 52 has a bore (hub) 64 at its radially innermost extent and a relatively thinner web 62 between the bore 64 and rim 58. Similarly, the disk member 54 has a bore (hub) 72 at its radially innermost extent and a relatively thinner web portion 70 at its radially outermost extent. Through-holes (not shown) are centrally located in the bores 64 and 72 of the integral disk portion 60 and the disk member 54, respectively, for mounting the blisk 50 on a shaft (not shown) driven by the turbine section of the engine. As such, the through-holes have central axes that coincide with the rotational axis 88 (FIG. 5) of the blisk 50, and therefore also the axes of symmetry of the rim and disk members 52 and 54.

The rim, disk and airfoil members 52, 54 and 56 can be produced by a variety of known processes, including powder metallurgy (P/M), forging, cast and wrought processing, spraycast forming, and nucleated, equiaxed, directionally solidified (DS), and single crystal (SX) casting techniques. In a particular embodiment, the rim and disk members 52 and 54 are produced by forging billets formed by powder metallurgy, and the airfoil member 56 is produced by an equiaxed cast-plus-wrought technique. More broadly, the disk (bore) member 54 may be produced by a powder metallurgy technique or a cast and wrought technique, the rim (web) member 52 may be produced by a powder metallurgy technique or a cast and wrought technique, and the airfoil member 56 may be produced by an equiaxed cast-plus-wrought technique, an equiaxed, DS or SX casting technique, or a powder metallurgy technique. In addition, the rim, disk and airfoil members 52, 54 and 56 can be produced from a wide variety of materials chosen on the basis of the operating conditions to which the rim, disk and airfoil members 52, 54 and 56 will be subjected when the blisk 50 is installed in a turbomachine, such as a gas turbine engine. Nonlimiting examples of suitable materials include the aforementioned titanium-, cobalt-, nickel-, and steel-based alloys. The invention is believed to be particularly applicable to welding nickel alloys together and welding titanium alloys together, with potential applications when welding dissimilar alloys together. Importantly, the rim, disk and airfoil members 52, 54 and 56 can be produced from different alloys, so that the blisk 50 is a multi-alloy component whose rim, disk and airfoil members 52, 54 and 56 can be formed of materials better tailored for different operating conditions to which the rim, disk and airfoil members 52, 54 and 56 will be subjected. In particular, the rim member 52 may be fabricated from a nickel-base alloy and have relatively coarse grains to promote creep, stress-rupture, and crack growth resistance, the disk member 54 may be fabricated from a different nickel-base alloy and have relatively finer grains to promote tensile strength and resistance to low cycle fatigue at temperatures relatively lower than those seen by the rim member 52, and the airfoil member 56 may be fabricated from yet another nickel-base alloy to have a fine-grained equiaxed microstructure to promote high cycle fatigue (HCF) resistance or to have an equiaxed, DS, or SX microstructure to promote creep resistance at temperatures higher than those seen by the rim and disk members 52 and 54.

Figure 3:
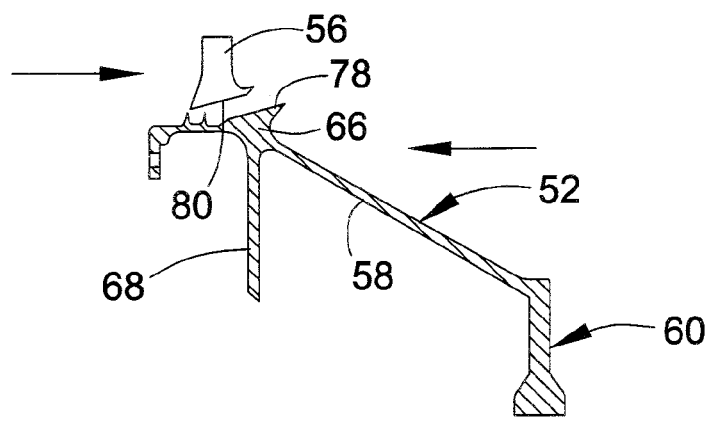
FIGS. 3 and 4 represent steps performed in a process of inertia welding the subcomponents of the blisk shown in FIG. 2 in accordance with an embodiment of the present invention.

The rim, disk and airfoil members 52, 54 and 56 are shown in FIG. 2 as having machined surfaces that define pre-weld interface surfaces 74, 76, 78 and 80 at which joining occurs by inertia welding in FIGS. 3 and 4. The pre-weld interface surfaces 74 and 76 are represented as being located on the web portions 68 and 70 of the rim and disk members 52 and 54, respectively. The pre-weld interface surfaces 78 and 80 are represented as being located on the platform portion 66 of the rim member 52 and on a radially inward face of the airfoil member 56, respectively. The pre-weld interface surfaces 74, 76, 78 and 80 are represented as lying in planes oriented at angles other than parallel to the axis 88 of the blisk 50, providing pre-weld joint interface angles that facilitate assembling and mating of the airfoil member 56 with the annular-shaped rim member 52 in the direction of the arrows in FIG. 3, and assembling and mating of the rim member 52 around the disk member 54 in the direction of the arrows in FIG. 4. Preferred pre-weld joint interface angles are believed to be in a range of about 30 to about 60 degrees relative to the rotational axis 88 of the blisk 50. The resulting post-weld joints 82 and 84 shown in FIG. 5 are also inclined at roughly the same angles as their pre-weld interface surfaces 74, 76, 78 and 80. However, it is foreseeable that portions of the post-weld joints 82 and 84 could be parallel to the blisk axis 88, particularly near their outermost edges.

As known in the art, inertia welding is a solid-state welding process. Various inertia welding techniques, equipment and tooling may be employed to carry out inertia welding of the blisk 50. The inertia welding process represented by the steps of FIGS. 3 and 4 is a nonlimiting example accomplished by relative rotational movement between the rim, disk and airfoil members 52, 54 and 56 about the blisk axis 88. FIGS. 3 and 4 represent the airfoil member 56 as first being inertia welded to the rim member 52 to form a welded subassembly 90, followed by inertia welding the disk member 54 to the subassembly 90. However, it should be understood that the rim and disk members 52 and 54 could be welded together first to form a welded subassembly, followed by welding the airfoil member 56 to this subassembly.

As a matter of convenience, in the inertia welding step represented in FIG. 3 the airfoil member 56 may be held stationary and the rim member 52 is rotated. While relative rotation is occurring, either or both of the rim and airfoil members 52 and 56 are moved along paths parallel to the axis of symmetry of the rim member 52 until their respective pre-weld interface surfaces 78 and 80 come in contact. As relative rotation continues in combination with increasing axial force, the pre-weld interface surfaces 78 and 80 generate frictional heating, increasing the temperatures of the regions underlying the surfaces 78 and 80 of the rim and airfoil members 52 and 56 to temperatures approaching the incipient melting temperatures of the materials from which the members 52 and 56 are made. In a preferred embodiment, a radial force can also be applied to the airfoil member 56, such as with a secondary collet or hydraulic arbor, to avoid radial deformation and thereby better achieve dimensional requirements. Alternatively, the airfoil member 56 could be modified to increase its resistance to radial deformation, though a drawback to doing so is the additional material that must be removed if the additional weight is to be avoided in the final welded blisk 50. The axial force (and optional radial force), the relative rotational speeds and input rotational energy at initiation of welding, and the relative displacements necessary to inertia weld the members 52 and 56 will vary, depending on the size, mass and materials of the members 52 and 56 and the surface areas of their pre-weld interface surfaces 78 and 80. The members 52 and 56 are held in contact under these conditions for a period of time sufficient to promote bonding along their pre-weld interface surfaces 78 and 80 as the rotational speed decays to zero, forming a solid-state weld joint 84 (FIG. 4) that contains fine-grained material as a result of the temperatures sustained during inertia welding.

As represented in FIG. 4, the disk member 54 is inertia welded to the welded subassembly 90 produced by the inertia welding step of FIG. 3. As a matter of convenience, the subassembly 90 may be held stationary and the disk member 54 rotated. While relative rotation is occurring, either or both the disk member 54 and subassembly 90 is moved along a path parallel to the axis of symmetry of the disk member 54 until their respective pre-weld interface surfaces 74 and 76 come in contact and, with increasing axial force, generate sufficient frictional heating to increase the temperatures of the regions underlying their pre-weld interface surfaces 74 and 76 and eventually form a solid-state weld joint 82, similar in manner as described above for inertia welding of the rim and airfoil members 52 and 56. Again, an optional radial force may be applied to the subassembly 90, and the axial force, radial force (if applied), relative rotational speeds and input rotational energy, and relative displacements necessary to inertia weld the rim and disk members 52 and 54 will vary, depending on the size, mass and materials of the members 52 and 54 and the surface areas of their pre-weld interface surfaces 74 and 76.

As another example, an inertia welding process is described below in terms of welding the rim and disk members 52 and 54 together first to form a welded subassembly, followed by welding the airfoil member 56 to this subassembly to yield a welded assembly that, after appropriate additional processing, can yield the blisk 50 of FIG. 5. However, as before it should be understood that the rim and airfoil members 52 and 56 could be welded together first to form a welded subassembly, followed by welding the disk members 54 to this subassembly.

At the start of the inertia welding process, the rim and disk members 52 and 54 are moved and inertia welded together by rotating the disk member 54 while moving the rim member 52 in a direction parallel to the rotational axis of the disk member 54 until their pre-weld interface surfaces contact each other. As before, the rim member 52 may be further engaged by a secondary collet or hydraulic arbor that applies a force in a radial direction to the rotational axis until the rim and disk members 52 and 54 are inertia welded together to form the welded subassembly, which is metallurgically held together by the solid-state weld joint 82.

Subsequently, the airfoil member 56 is inertia welded to the welded subassembly produced in the previous step. The airfoil member 56 is rotated about its rotational axis while the subassembly is moved parallel to the rotational axis until the pre-weld interface surfaces of the rim and airfoil members 52 and 56 contact each other. As before, force is applied to the airfoil member 56 in the axial direction to the rotational axis and preferably but optionally in a radial direction to the rotational axis, while the rim and airfoil members 52 and 56 are inertia welded together to form the final welded assembly, which is metallurgically joined together by the post-weld joints 82 and 84.

Prior to inertia welding the airfoil member 56 to the welded subassembly formed by the rim and disk members 52 and 54, it may be desirable to supersolvus heat treat the subassembly to achieve a substantially uniform grain size in the subassembly. Grain sizes within the rim and disk members 52 and 54, and particularly in the rim 58, integral disk portion 60 and web portion 68 of the rim member 52 and the web portion 70 and bore 72 of the disk member 54, can be further controlled and, if desired, modified by the manner in which the rim and disk members 52 and 54 was produced. For example, the rim member 52 can undergo relatively slower forging at higher temperatures than the disk member 54 to yield a coarser grain size in the rim member 52 and, subsequently, a coarser grain size in the rim 58, integral disk portion 60 and web portion 68 of the rim member 52. In addition or alternatively, a dual heat treatment can be performed on the subassembly, in which the rim and disk members 52 and 54 are subjected to different supersolvus and/or different stabilization/aging temperatures to optimize their grain size and properties. Suitable forging and heat treatments conditions will depend on the particular materials and sizes of the rim and disk members 52 and 54 and are generally within the knowledge and capability of those skilled in the art, and therefore will not be discussed in any further detail here.

As evident from the above, the processes described above can be employed to produce a blisk (or other rotating hardware) comprising three or more subcomponents to yield, if so desired, a multi-alloy blisk whose individual subcomponents may be formed of different materials and/or may have different microstructures. This capability is advantageous in view of the rim, bore and blades of a blisk are generally subjected to different operating conditions, particularly in terms of temperature, vibration, fatigue, and mechanically and thermally-induced stresses and strains, and therefore will typically benefit from being formed of different materials and/or by different processes that can achieve different grain sizes and microstructures within the rim, bore and blades.

While the invention has been described in terms of specific embodiments, it is apparent that other forms could be adopted by one skilled in the art. Therefore, the scope of the invention is to be limited only by the following claims.

The invention claimed is:

1. A process of fabricating a rotating component having a rotational axis and comprising at least a rim, at least a first disk, and multiple airfoils, the process comprising:
    separately fabricating a rim member, at least one disk member, and at least one airfoil member to have axes of symmetry coinciding with the rotational axis of the component, the rim member and the disk member having, respectively, at least one integral web portion and a second web portion that together correspond to the first disk of the component;
    forming pre-weld interface surfaces on the integral and second web portions of, respectively, the rim and disk members at which the rim and disk members can be joined to locate the rim member in a radially outward direction of the disk member and forming pre-weld interface surfaces on the rim and airfoil members at which the rim and airfoil members can be joined to locate the airfoil member in a radially outward direction of the rim member, the pre-weld interface surfaces lying in planes that are not parallel to the rotational axis of the rotating component; and then
    inertia welding the rim, disk and airfoil members by welding two of the rim, disk and airfoil members together by causing relative axial and rotational movement therebetween and forming a first solid-state weld joint at the pre-weld interface surfaces thereof to thereby form a welded subassembly, and then inertia welding the welded subassembly to the third of the rim, disk and airfoil members by causing relative axial and rotational movement therebetween and forming a second solid-state weld joint at the pre-weld interface surfaces thereof, the inertia welding of the rim, disk and airfoil members resulting in the integral web portion of the rim member and the second web portion of the disk member being joined together to form the first disk of the rotating component.

2. The process according to claim 1, wherein the inertia welding steps comprise:
    moving at least one of the rim and airfoil members parallel to the axes of symmetry of the rim and airfoil members and inertia welding the rim and airfoil members together at the pre-weld interface surfaces thereof so that the airfoil member is located in the radially outward direction from the rim member and is metallurgically joined to the rim member with the first solid-state weld joint to form a welded subassembly having an axis of symmetry coinciding with the rotational axis of the component; and
    moving at least one of the welded subassembly and the disk member parallel to the axes of symmetry of the welded subassembly and the disk member and inertia welding the welded subassembly and the disk member together at the pre-weld interface surfaces on the integral web portion of the rim member and on the second web portion of the disk member so that the rim member is located in the radially outward direction from the disk member and the integral web portion of the rim member is metallurgically joined to the second web portion of the disk member with the second solid-state weld joint to form the first disk of the rotating component.

3. The process according to claim 2, wherein the step of moving and inertia welding the rim and airfoil members together comprises:
    rotating the rim member about the axis of rotation thereof;
    moving the airfoil member in a direction parallel to the axis of rotation of the rim member until the pre-weld interface surfaces of the rim and airfoil members contact each other; and
    continuing to rotate the rim member and applying a radial force to the airfoil member until the rim and airfoil members are inertia welded together to form the first solid-state weld joint and the welded subassembly.

4. The process according to claim 2, wherein the step of moving and inertia welding the welded subassembly and the disk member together comprises:
    rotating the disk member about the axis of rotation thereof;
    moving the welded subassembly in a direction parallel to the axis of rotation of the disk member until the pre-weld interface surfaces on the integral and second web portions, respectively, of the rim and disk members contact each other; and
    continuing to rotate the disk member and applying a radial force to the welded subassembly until the rim and disk members are inertia welded together with the second solid-state weld joint.

5. The process according to claim 1, wherein the inertia welding steps comprise:
    moving at least one of the rim and disk members parallel to the axes of symmetry of the rim and disk members and inertia welding the rim and disk members together at the pre-weld interface surfaces thereof so that the rim member is located in the radially outward direction from the disk member and is metallurgically joined to the disk member with the first solid-state weld joint between the integral web portion of the rim member and the second web portion of the disk member to form a welded subassembly having an axis of symmetry coinciding with the rotational axis of the component, the second solid-state weld joint metallurgically joining the integral web portion of the rim member to the second web portion of the disk member to form the first disk of the rotating component; and
    moving at least one of the welded subassembly and the airfoil member parallel to the axes of symmetry of the welded subassembly and the airfoil member and inertia welding the welded subassembly and the airfoil member together at the pre-weld interface surfaces of the rim member and the airfoil member so that the airfoil member is located in the radially outward direction from the rim member and the airfoil member is metallurgically joined to the rim member with the second solid-state weld joint.

6. The process according to claim 5, wherein the step of moving and inertia welding the rim and disk members together comprises:
rotating the disk member about the axis of rotation thereof;
moving the rim member parallel to the axis of symmetry of the disk member until the pre-weld interface surfaces on the integral and second web portions, respectively, of the rim and disk members contact each other; and
continuing to rotate the disk member and applying a radial force to the rim member until the rim and disk members are inertia welded together to form the first solid-state weld joint and the welded subassembly.

7. The process according to claim 5, wherein the step of moving and inertia welding the welded subassembly and the airfoil member together comprises:
rotating the airfoil member about the axis of rotation thereof;
moving the welded subassembly in a direction parallel to the axis of rotation of the airfoil member until the pre-weld interface surfaces of the rim and airfoil members contact each other; and
continuing to rotate the airfoil member and applying a radial force to the airfoil member until the rim and airfoil members are inertia welded together with the second solid-state weld joint.

8. The process according to claim 1, wherein the pre-weld interface surfaces of the rim, disk and airfoil members lie in planes inclined to the rotational axis of the component.

9. The process according to claim 1, wherein the integral and second web portions of, respectively, the rim and disk members have axial thicknesses less than a maximum thickness of the disk member, and the first solid-state weld joint is located within a web of the first disk of the component that is formed by the integral web portion of the rim member and the second web portion of the disk member and interconnects the rim member and the disk member following the inertia welding steps.

10. The process according to claim 1, wherein the rim and disk members are formed by forging prior to the inertia welding steps.

11. The process according to claim 1, wherein the airfoil member is formed by casting prior to the inertia welding steps.

12. The process according to claim 1, wherein the rim and disk members are formed of different alloys.

13. The process according to claim 1, wherein the rim and airfoil members are formed of different alloys.

14. The process according to claim 1, wherein the component is a blisk of a gas turbine engine, the process further comprising installing the blisk in a gas turbine engine so that the rim member is located radially outward from the disk member.

15. The process according to claim 1, wherein the rim member has at least one integral disk portion, and the inertia welding of the rim, disk and airfoil members result in the integral disk portion of the rim member defining a second disk of the rotating component.

* * * * *